United States Patent [19]
Jackson

[11] 4,447,321
[45] May 8, 1984

[54] LIQUID DRAIN SYSTEM

[76] Inventor: Henry D. Jackson, P.O. Box 475, Somerset West, 7130, South Africa

[21] Appl. No.: 430,325

[22] Filed: Sep. 30, 1982

[30] Foreign Application Priority Data

Mar. 29, 1982 [ZA] South Africa .................. 82/2141

[51] Int. Cl.³ ............................................. B03D 3/00
[52] U.S. Cl. ..................................... 210/86; 210/114; 210/117
[58] Field of Search ................. 210/86, 114, 115, 117, 210/96.1

[56] References Cited

U.S. PATENT DOCUMENTS

| | | | |
|---|---|---|---|
| 2,193,261 | 3/1940 | Thompson | 210/114 X |
| 3,578,164 | 5/1971 | Weiss | 210/96.1 |
| 3,868,321 | 2/1975 | Gough | |
| 4,010,101 | 3/1977 | Davey | |
| 4,264,442 | 4/1981 | Jackson | |

FOREIGN PATENT DOCUMENTS

1062701 3/1967 United Kingdom .

Primary Examiner—John Adee
Attorney, Agent, or Firm—Harness, Dickey & Pierce

[57] ABSTRACT

This invention provides a drain system for draining, from a settling chamber of a trapping device, foreign liquid which has separated from a supply liquid flowing through the device. The foreign liquid has a specific gravity greater than that of the supply liquid. The drain system includes a float in the lower part of the chamber and having a specific gravity higher than that of the supply liquid and lower than that of the foreign liquid for floating on foreign liquid in the chamber. An indicator is movable with the float, and a sensor mechanically isolated from the indicator is connected to an electrical signal circuit for causing an actuating signal in response to detection by the float of a predetermined quantity of foreign liquid in the settling chamber. A pump is responsive to such an actuating signal for effecting draining of foreign liquids from the chamber.

6 Claims, 2 Drawing Figures

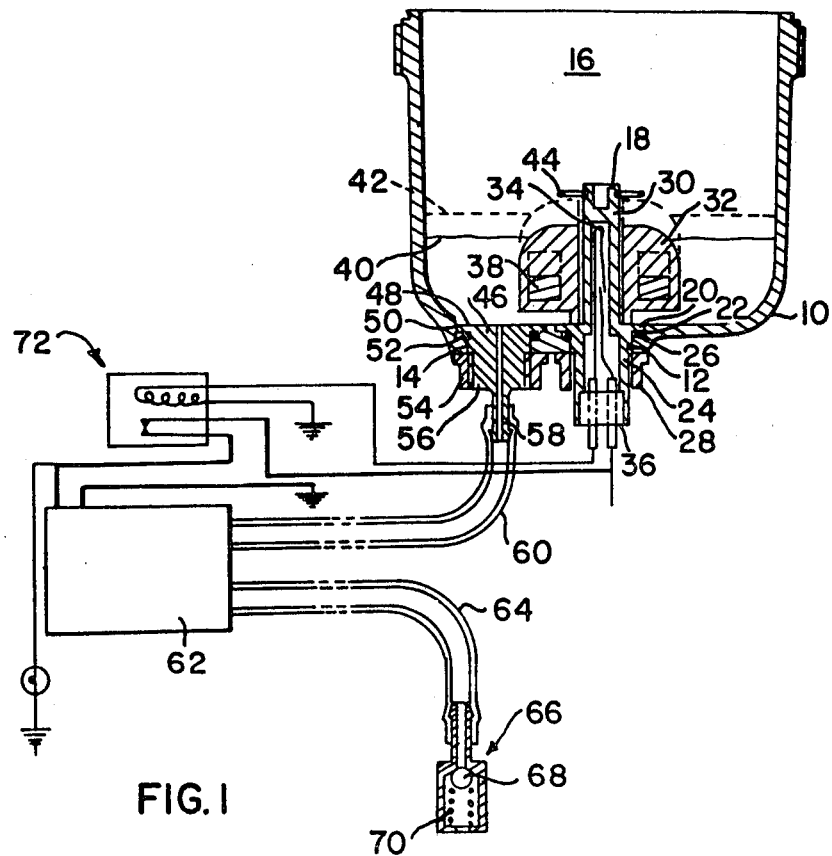
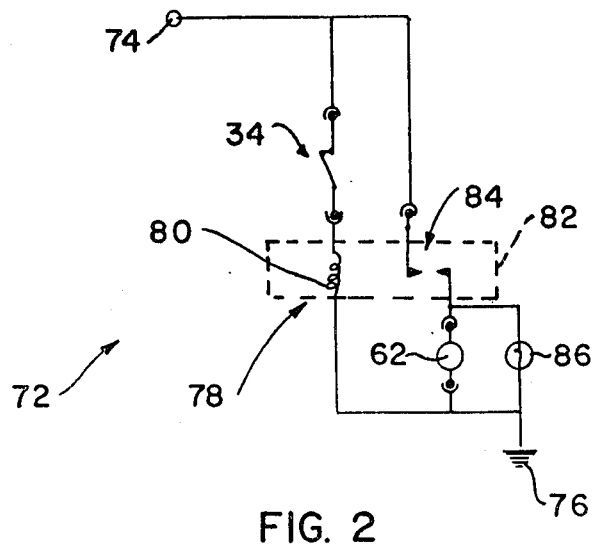

LIQUID DRAIN SYSTEM

FIELD OF THE INVENTION

This invention relates to a drain system for draining foreign liquid which has been separated from a supply liquid. Such a system may form part of a trapping device for connection to a liquid supply line for trapping foreign liquid contained in the supply liquid.

BACKGROUND OF THE INVENTION

Trapping devices are described in U.K. Pat. No. 1,062,701 and U.S. Pat. No. 4,010,101. These devices have walls defining a settling chamber. A foraminous element is provided in each device and arranged in such a way that liquid flowing from an inlet opening to an outlet opening will pass at least once through the foraminous element, separation of foreign liquid resulting from the passage of the supply liquid through the device in such a way that separated foreign liquids settle in the settling chamber.

A manually operated drain outlet valve was originally provided for the lower region of the settling chamber to permit foreign liquids which are separated out and trapped in the settling chamber, to be drained from the chamber after a warning signal had been provided in response to a float-operated detecting system.

U.S. Pat. No. 4,264,442 also disclosed a trapping device with means for separating such foreign liquids from the supply liquid as the foreign liquids and supply liquid pass through a settling chamber having a lower zone for receiving foreign liquids having a specific gravity higher than that of a supply liquid. Detector contacts extended into the chamber for detecting the presence in the settling chamber of such foreign liquids, and an educer-operated drain outlet valve was provided for draining the settling chamber. This valve required an educer having a flow passage connectable to a compressed air source, whereby flow of compressed air through said air passage created suitable low pressure conditions in a valve chamber for moving a valve member clear of a valve seat and permitting foreign liquids to flow through a drain opening and from said settling chamber. However, this requires compressed air lines from a compressed air source.

In addition, the detector contacts, which were intended to replace the float-operated detecting systems of the earlier patent specifications, could be actuated more readily by splashing of the foreign liquids, and was not wholly successful. It is therefore desirable to provide an improved drain system which preferably operates without the need for a compressed air supply.

SUMMARY OF THE INVENTION

According to the invention, there is provided a drain system for draining, from a settling chamber of a trapping device, foreign liquid which has separated from a supply liquid flowing through the device, the foreign liquid having a specific gravity greater than that of the supply liquid, the drain system comprising a float in the lower part of the chamber and having a specific gravity higher than that of the supply liquid and lower than that of the foreign liquid for floating on foreign liquid in the chamber, an indicator movable with the float, a sensor mechanically isolated from the indicator and connected to an electrical signal circuit means for causing an actuating signal in response to detection of a predetermined quantity of foreign liquid in the settling chamber, and means responsive to such an actuating signal for effecting draining of foreign liquids from the chamber.

The chamber may be of any suitable form and may form part of a trapping device for connection to a liquid supply line for separating from a supply liquid, foreign liquids contained in the supply liquid. Such a device is particularly suitable for connection to a fuel supply line for an internal combustion engine for separating water from fuel.

Means may be provided for guiding the float along a predetermined path in the chamber as the float floats on the foreign liquids. The sensor may then be arranged for actuation by the indicator when the indicator moves to a predetermined region of the predetermined path.

The float may be arranged substantially in the lowest region of the chamber and may be approximately centrally located in the chamber. The guiding means may then be a column extending upwardly from the base of the chamber, and the float may be arranged at least partly to encircle the column. The centre of buoyancy of the float may be substantially on the axis of the column and may follow that axis as the float moves so that the float is unlikely to tilt and lock on the column as it rises. Of course, suitable clearance can be provided to allow free floating movement of the float up the column.

The indicator may comprise one or more magnets carried by the float, and preferably embedded in the float, and the sensor may then be responsive to the magnets. For example, a reed switch in the guiding means may be provided as the sensor.

The draining means may include a pump for pumping the foreign liquids from the chamber to drain the chamber in response to an actuating signal while normally preventing draining of the foreign liquid. The actuating signal may result from connection of the pump to a suitable power source upon operation of the electrical signal circuit means by the sensor.

BRIEF DESCRIPTION OF THE DRAWING

An embodiment of the invention will now be described, by way of example, with reference to the accompanying drawing, in which FIG. 1 is a schematic cross-section through part of a fuel supply system; and FIG. 2 schematically illustrates essential electrical components of the drain system of the fuel supply system.

DETAILED DESCRIPTION OF THE DRAWING

Referring firstly to FIG. 1, a container has a lower part in the form of a bowl 10. The container is part of a trapping device for connection to a liquid fuel supply line for trapping foreign liquids, in this case water, contained in the supply liquid, in this case liquid diesolene fuel. The foreign liquid has a specific gravity greater than that of the supply liquid. Devices of this nature are well-known and one suitable device is disclosed in my co-pending Application Ser. No. 312,918, details of which are incorporated herein by this reference. The bowl 10 is moulded of electrically insulating synthetic plastics material and contains two ports 12 and 14 in its base. The container defines a settling chamber 16 above this base, only part of which is shown.

A guide element 18 is fitted in the port 12 and has an annular flange 20 seated in a complementary annular socket 22 at the upper part of the port 12. A downwardly extending portion 24 of the element 18 fits snugly within the port 12, and an O-ring seal 26 fits in an annular seat in the bottom of the socket 22. A nut 28 is screwed onto a threaded part of the portion 24 and secures the element 18 in the port 12 while causing the seal 26 to be compressed and to prevent escape of liquid between the bowl 10 and the element 18.

Part of the element 18 provides a column 30 which extends upwardly from the base of the bowl 10 and which is located substantially centrally of the base of the bowl. The column 30 serves as a guide for guiding an annular float 32 long a predetermined guide path.

As shown in FIG. 1, the element 18 is hollow and a reed switch 34 is received in the hollow interior of the column 30, being held in place by plug 36 placed into the bottom of the element 18. The interior of the element 18 is thus sealed.

The float 32, which encircles the column 30 with a limited clearance, is an annular float having a specific gravity greater than that of the supply liquid supplied to the container, but less than that of foreign liquids which separate from the supply liquid and settle in the bottom of the container. In order to limit tilting and accidental locking of the float on the column 30, the float is designed so that its centre of buoyancy is substantially on the central axis of the column, and travels along that axis as the float moves. Magnets 38 are embedded in the float 32 and thus move with the float as the float moves up and down the column.

When the water level of the water in the bowl is substantially at the lower level 40 illustrated, the float is in the position shown in solid lines. However, when the water level rises to the upper level 42, the float rises to the position illustrated in chain lines in FIG. 1. Stops 44 are provided at the top of the column to prevent the float from leaving the column.

For draining foreign liquids from the bowl 10, a tubular adaptor 46 is fitted snugly within the port 14. The adaptor has an annular flange 48 fitting in a complementary recess 50 at the upper part of the port. An O-ring seal 52 in an annular seat at the bottom of the recess 50 provides a seal between the adaptor and the bowl. The adaptor is secured in the port by a nut 54 screwed onto a lower threaded bottom portion 56 of the adaptor, and causing some compression of the seal 52.

A nozzle 58 is provided at the bottom of the adaptor and flexible tubing 60 is forced onto and retained by the adaptor in a conventional manner. The tubing 60 is connected to an inlet of a pump 62, the pump having its outlet connected to further flexible tubing 64 leading to a check valve 66. The check valve is a non-return valve allowing water to be pumped from the bowl 10 but having a ball 68 and a spring 70 preventing the pump from pumping air or liquids back into the bowl 10. The pump 62 is any suitable pump capable of preventing draining of foreign liquids from the chamber 16 when not in operation, such as a suitable peristaltic pump.

Referring now to the electrical components of FIGS. 1 and 2, an electrical circuit 72 is connected to an electrical power source by a supply terminal 74 and an earth terminal 76, in a conventional manner. Any suitable power source may be used. The electrical circuit includes an electrical signal circuit means 78 including a relay coil 80 connected in series with the reed switch 34. The relay coil forms part of a relay 82 having relay contacts 84 connected in series with the electrical terminals of the pump 62 so that, when the relay contacts are closed, the pump will operate. A warning lamp 86 is connected in parallel with the pump to indicate when the pump is operating. Instead of providing a warning lamp, an audible signal device may be used.

In use, the trapping device, of which the bowl 10 forms part, causes water to separate from fuel passing through the device. The water accumulates in the bowl 10, and the pump 62 prevents flow of liquid through the tubing 60 to the tubing 64. The float 32 remains in a position resting on the part of the element 18 at the level of the base of the bowl until the water level reaches its lower level 40. As the water level increases above this level, the float begins to rise.

Water continues to collect in the bowl until the water level is substantially at the upper level 42 shown in FIG. 1. At this level, the magnets 38 are in a position to close the reed switch 34, energising the relay coil 80 and causing the relay contacts 84 to close. The pump 62 then begins to operate, drawing water from the bowl.

The reed switch is arranged so that it will remain closed substantially until the water level has returned to the level 40 and the float has returned to its original position. It will then open, de-energising the relay coil 80, and allowing the contacts 84 to open and the pump to stop operating. At this time, the pump will again prevent flow through the tubing 60.

The flexible tubing 60 and 64 may be of any suitable length and has the advantage that it can be long enough to allow the check valve to be located in a suitable reservoir, if desired.

Although the pump 62 is shown separately from the adaptor 46, it has been found that a suitably small pump can be formed with a housing integral with the adaptor, reducing the number of parts used.

I claim:

1. A drain system for draining, from a settling chamber of a trapping device, foreign liquid which has separated from a supply liquid flowing through the device, the foreign liquid having a specific gravity greater than that of the supply liquid, the drain system comprising
   a float in the form of an annulus in the lower part of the settling chamber and having a specific gravity higher than that of the supply liquid and lower than that of the foreign liquid for floating on foreign liquid in the chamber,
   a column for guiding the float along a predetermined path in the chamber as the float floats on the foreign liquids, said annulus encircling said column and being rotatable about said column by movement of liquid in said chamber,
   an indicator located in and movable with the annulus of the float,
   a sensor mechanically isolated from the indicator, said sensor being arranged in said column for actuation by the indicator when the indicator moves to a predetermined region of the predetermined path,
   an electrical signal circuit means responsively connected to said sensor for causing an actuating signal in response to detection of a predetermined quantity of foreign liquid in the settling chamber, and
   means responsible to such an actuating signal for effecting drainage of foreign liquids from the chamber.

2. The system of claim 1, including means for guiding the float along a predetermined path in the chamber as the float floats on the foreign liquids, said sensor being arranged for actuation by the indicator when the indicator moves to a predetermined region of the predetermined path.

3. The system of claim 1, wherein said float is arranged substantially in a lowest region of the chamber and is approximately centrally located in the chamber, and wherein said column extends upwardly from the base of the chamber.

4. The system of claim 3, wherein said float has a centre of bouyancy substantially on the axis of the column and is guided for following that axis as the float moves up or down the column.

5. The system of claim 2, wherein said indicator comprises at least one magnet carried by the float, and wherein the sensor comprises a reed switch in the guiding means and responsive to the magnet.

6. The system of claim 1, wherein said draining means includes a pump for pumping foreign liquids from the chamber to drain the chamber in response to an actuating signal from said electrical signal circuit means, said pump normally preventing draining of foreign liquid.

* * * * *